Figure 1:
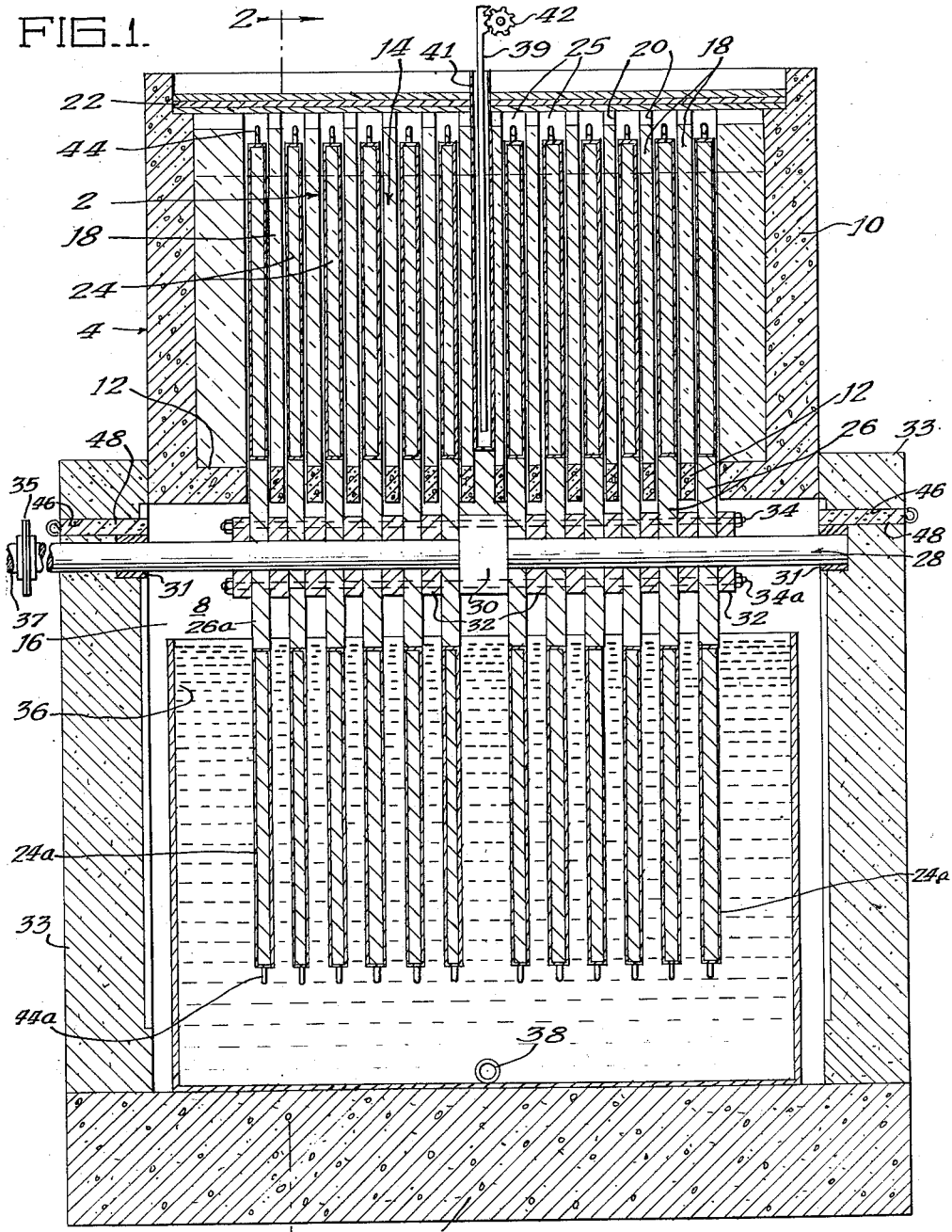

Nov. 5, 1957

J. A. WHEELER 2,812,304

MEANS FOR COOLING REACTORS

Filed Jan. 9, 1946

2 Sheets-Sheet 2

Witnesses:
Hubert E. Metcalf
Walter L. Schlegel, Jr.

Inventor:
John A. Wheeler
By Robert A. [Saunders]
Attorney

United States Patent Office 2,812,304
Patented Nov. 5, 1957

2,812,304

MEANS FOR COOLING REACTORS

John A. Wheeler, Princeton, N. J., assignor to the United States of America as represented by the United States Atomic Energy Commission Application January 9, 1946, Serial No. 640,101

2 Claims. (Cl. 204—193.2)

This invention relates to neutronic reactors and more particularly to a novel method and means for cooling the fissionable material within such a reactor by rotating said material through a coolant fluid disposed externally of the neutron moderator within which the fissionable material is normally disposed.

In neutronic reactors, a thermal neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. In general such reactors comprise bodies of compositions containing thermal neutron fissionable material such, for example, as natural uranium, disposed in a neutron slowing material which slows the neutrons to thermal energies. Such a slowing material is termed a neutron moderator. Carbon and $D_2O$ (heavy water) are typical moderators suitable for such use. Heat is evolved during the reaction which is removed by passage of a coolant through the reactor in heat exchange relationship therewith. Specific details of the theory and essential characteristics of such reactors are set forth in Fermi et al. Patent 2,708,656, dated May 17, 1955 and the continuation-in-part thereof, Serial No. 621,838, filed October 11, 1945.

In neutronic reactors, the ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently a system of finite size may be said to have a K constant, even though the value thereof would only exist if the system as built were extended to infinity without change of geometry or materials. Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size, therefore, differs from K by the external leakage factor, and by a factor due to the neutron absorption by localized neutron absorbers, and the reproduction ratio must still be sufficiently greater than unity to permit neutron density to rise exponentially with time in the system as built.

During the interchange of neutrons in a system of finite size, comprising bodies of any size disposed in a neutron moderator, neutrons may be lost to the chain reaction in four ways:

(1) by absorption or capture in the uranium content of the bodies without producing fission;

(2) by absorption or capture in the moderator material itself;

(3) by absorption or capture by the impurities present in both the uranium bodies and the moderator; and (4) by leakage out of the system through the periphery thereof.

An object of the invention is to provide a novel method and means for rotating the fissionable material of a neutronic reactor through passages in the neutron moderator thereof and through a coolant fluid disposed externally of said passages.

A more specific object of the invention is to provide alternately arranged slabs of neutron moderator and fissionable material to form a neutronic reactor capable of sustaining a nuclear fission chain reaction, means being provided for rotating certain of said slabs through a coolant fluid disposed externally of the reactor.

Another object of the invention is to design a neutronic reactor, such as above described, wherein the fissionable material is in the form of plates or slabs mounted on a rotatable shaft, said shaft being operable to rotate the plates containing fissionable material through neutron moderating means and through cooling means spaced from said moderating means at one side thereof.

Still another object of the invention is to provide a system, such as above described, wherein a body of neutron moderator with passages therethrough is disposed above a body of coolant fluid, and plates of fissionable material are attached to a rotatable shaft intermediate said bodies and are rotated by means of said shaft through said passages and through said fluid.

Figure 2:
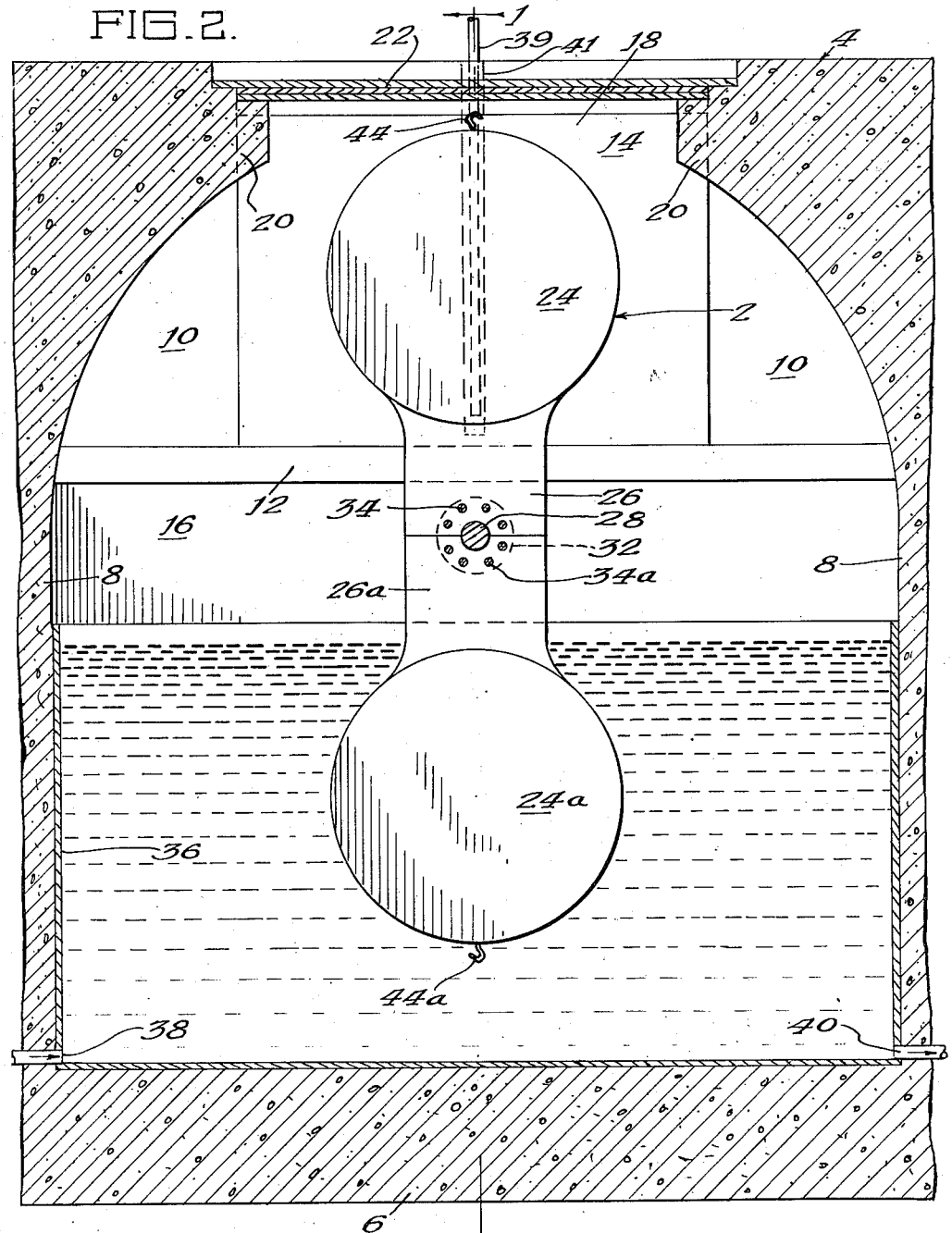

The foregoing and other objects and advantages of the invention will become apparent from a consideration of the following specification and the accompanying drawings wherein, Fig. 1 is a central longitudinal sectional view of a structure embodying the invention, and view being taken in a vertical longitudinal plane approximately bisecting the structure as indicated by the line 1—1 of Fig. 2, portions of the structure being shown in elevation to clarify the illustration; and Fig. 2 is a sectional view taken in the transverse vertical plane indicated by the line 2—2 of Fig. 1.

Describing the invention in detail, a neutronic reactor generally designated 2 is disposed within a concrete vault generally designated 4 and adapted to absorb biologically harmful emanations from the reactor 2, said vault comprising a bottom wall or foundation 6, spaced side walls 8 (Fig. 2) upstanding therefrom, and upper end walls 10 extending between the side walls 8 and spaced from the bottom wall 6. Extending between the side walls 8 is a plurality of spaced ledges or ribs 12 dividing the vault into an upper reaction chamber 14 and a lower coolant chamber 16. The end ledges 12, as may best be seen in Fig. 1, merge with the end walls 10 adjacent the lower extremities thereof.

The neutronic reactor generally designated 2 comprises a plurality of slabs or plates 18 of neutron moderator material, such as graphite or beryllium, said slabs 18 being supported on the ledges or ribs 12. The ends of the slabs, as may best be seen in Fig. 2, are slidably fitted in guide slots or recesses 20 in the side walls 8 adjacent the upper extremities thereof, whereby the slabs 18 may be readily assembled or disassembled from the top of the reaction chamber 14, which is normally closed by a cover 22 composed of alternate layers of iron and wood-fiber board adapted to absorb biologically harmful emanations such as neutrons and alpha, beta and gamma rays developed within the reactor 2.

A plurality of round slabs or plates 24 are interleaved within spaces or slots 25 between the moderator slabs 18, said plates containing fissionable material, such as $U^{235}$ or $Pu^{239}$. The plates 24 are preferably composed of aluminum-coated uranium containing the fissionable isotope $U^{235}$ in natural abundance. If desired, the plates 24 may be enriched so as to contain a greater than natural abundance of fissionable material. The nature and amounts of fissionable material and moderator material constitute no part of the present invention, being by now well known to persons skilled in the art. The invention is applicable to any operative combination of fissionable material and moderator material and the requirements of purity and size for obtaining a self-sustaining chain reaction with various materials are not the subject of the invention, being already known.

The plates 24 are secured to or integrally formed with hubs 26 journalled on a rotatable shaft 28 having a central annular flange or lug 30. A plurality of rings 32 are sleeved on shaft 28, being alternately arranged with respect to the hubs 26, said rings and said hubs being urged towards the flange 30 by means of bolts 34, extending through complementary openings in the hubs 26 and the rings 32 and anchoring in the flange 30. It will be understood that by means of the above described arrangement, the plates 24 are secured to the rotatable shaft 28, which is midway between the reaction chamber and the coolant chamber, in proper spaced relationship and in alignment with the passages 25 between the moderator slabs 18, whereby the plates 24 may be rotated through said passages for a purpose hereinafter described in detail. The shaft 28 is mounted in bearings 31 (Fig. 1) carried by lead closure plates 33 for the ends of coolant chamber 16, and said shaft is connected at 35 to a drive shaft 37 rotated by any conventional means such as a motor (not shown).

A tank 36 containing a body of suitable coolant, such as ordinary water, is disposed within the coolant chamber 16. The coolant is circulated through the tank 36 by means of inlet and outlet pipes 38 and 40. When the nuclear fission chain reaction within the reactor 2 heats the plates 24 to a predetermined maximum temperature, said plates may be rotated by means of the shaft 28 into the coolant within the tank 36, and after the plates have been cooled they may be rotated back into their operative position within the moderator passages as shown in the drawings.

If desired, a series of plates 24a may be mounted on the shaft 28 in diametrically opposed relationship to the plates 24. The plates 24a are similar to the plates 24 and contain sufficient fissionable material to sustain a nuclear fission chain reaction within the moderator slabs 18, said plates 24a being welded to or integrally formed with hubs 26a secured to the before mentioned flange 30 by means of bolts 34a extending through the rings 32 and the hubs 26a, and anchoring in the flange 30. Thus, it will be understood that when the plates 24 are immersed within the coolant in the tank 36, the plates 24a are moved into the moderator passages to produce a nuclear fission chain reaction. If desired, the chain reaction may be continuous by substituting for the plates 24 and 24a annular members of fissionable material mounted on the shaft 28 for rotation therewith. In such an arrangement, by continuously rotating the shaft 28, the fissionable material would be continuously rotated through the moderator passages and through the coolant, so that a continuous chain reaction would be maintained without subjecting the reactor 2 to excessive temperatures.

The neutron density within the reactor 2 may be regulated by means of a control rod 39 of cadmium or other neutron absorbent material, said rod being reciprocable within an aluminum tube 41, extending vertically into the central moderator passage in vertical alignment with the flange 30 on the shaft 28. The control rod 39 is actuated as by a rack and pinion mechanism 42, whereby the rod may be inserted into or withdrawn from the reactor 2 to control the neutron reproduction ratio thereof, as more fully described in said copending application. The neutron density may be monitored by any conventional monitoring means, not shown.

It may be noted that each plate 24 is provided with a hook-like member 44 to facilitate insertion and removal of the plates 24 from the top of the chamber 14 during assembly and disassembly of the device; and each plate 24a is provided with a similar hook-like member 44a to facilitate insertion and removal of the plates 24a from the top of the reaction chamber 14. An aperture 46 is provided in each lead plate 33 for insertion of a tool for loosening bolts 34 and for withdrawing bolts 34 to permit removal of plates 24. Lead plugs 48 close apertures 46 when not being used as aforesaid.

Although the present invention has been described with reference to the specific details of the illustrated embodiment thereof, it is not intended that such details shall be regarded as limitations upon the scope of the invention, except insofar as included in the accompanying claims.

What is claimed is:

1. In combination with a neutronic reactor active portion of the type having a plurality of alternated slabs of thermal neutron fissionable material and moderator material constructed and arranged to sustain a neutronic chain reaction, the improved cooling means for said active portion comprising a tank adjacent thereto and containing coolant, a shaft extending between the tank and the active portion, the slabs of fissionable material being affixed to said shaft, and motive means for rotating the shaft.

2. In combination with a neutronic reactor active portion of the type having a plurality of alternated slabs of uranium and graphite constructed and arranged to sustain a neutronic chain reaction, the improved cooling means for said active portion comprising a tank adjacent thereto and containing coolant, a shaft extending between the tank and the active portion, the slabs of uranium being affixed to said shaft, and motive means for rotating the shaft.

References Cited in the file of this patent

UNITED STATES PATENTS

| | | |
|---|---|---|
| 1,262,248 | Perreur-Lloyd | Apr. 9, 1918 |
| 2,234,967 | Gilbert | Mar. 18, 1941 |
| 2,708,656 | Fermi et al. | May 17, 1955 |
| 2,736,696 | Wigner et al. | Feb. 28, 1956 |

FOREIGN PATENTS

| | | |
|---|---|---|
| 114,150 | Australia | May 2, 1940 |
| 114,151 | Australia | May 3, 1940 |
| 233,011 | Switzerland | Oct. 2, 1944 |

OTHER REFERENCES

Henney Radio Eng. Handbook, 3rd ed. p. 116 (1941) McGraw-Hill Book Co., N. Y.

Smyth: "A Gen. Account of the Develop. of Methods of Using Atomic Energy For Military Purposes," Aug. 1945, pub. by Supt. of Doc., Wash., D. C. pp. 22, 24, 25, 70, 82, 83, 84, 85, 103.

U. S. Atomic Energy Comm. MDDC 893 (paper by F. Daniels), date of Manuscript Apr. 1, 1947, available from AEC, Oak Ridge, Tenn., pp. 10, 11.

Kelly et al.: Phy. Rev. 73 1135–9 (1948.)